US008848971B2

(12) United States Patent
Vincent

(10) Patent No.: US 8,848,971 B2
(45) Date of Patent: Sep. 30, 2014

(54) PARALLAX EFFECT SECURITY ELEMENT

(75) Inventor: Rémi Vincent, Connaux (FR)

(73) Assignee: Arjowiggins Security, Paris (FR)

( * ) Notice: Subject to any disclaimer, the term of this patent is extended or adjusted under 35 U.S.C. 154(b) by 234 days.

(21) Appl. No.: 13/384,547

(22) PCT Filed: Jul. 19, 2010

(86) PCT No.: PCT/IB2010/053284
§ 371 (c)(1), (2), (4) Date: Apr. 6, 2012

(87) PCT Pub. No.: WO2011/007342
PCT Pub. Date: Jan. 20, 2011

(65) Prior Publication Data

US 2012/0189159 A1 Jul. 26, 2012

(30) Foreign Application Priority Data

Jul. 17, 2009 (FR) .................................... 09 55000

(51) Int. Cl.

| | |
|---|---|
| ***G06K 9/00*** | (2006.01) |
| ***G09F 3/03*** | (2006.01) |
| *B42D 15/00* | (2006.01) |
| *G09F 3/02* | (2006.01) |

(52) U.S. Cl.
CPC .......... *B42D 15/002* (2013.01); *B42D 2035/16* (2013.01); *B42D 2035/24* (2013.01); *B42D 15/0026* (2013.01); *G09F 2003/0277* (2013.01); *B42D 2033/10* (2013.01); *G09F 3/0341* (2013.01); *B42D 2035/20* (2013.01)
USPC .......................................................... 382/100

(58) Field of Classification Search
CPC .................. H04N 2201/327; G06T 2201/005; G06T 2201/0051
USPC ........ 283/86; 359/12, 3, 7, 15, 22, 24, 25, 31; 382/100, 210–214
See application file for complete search history.

(56) References Cited

U.S. PATENT DOCUMENTS 1,479,437 A 1/1924 Webster
2,021,141 A 11/1935 Boyer
(Continued)

FOREIGN PATENT DOCUMENTS

CA 2 471 379 12/2002
DE 10 2006 03737 2/2008
(Continued)

OTHER PUBLICATIONS

International Search Report dated Sep. 10, 2010 and Written Opinion dated Jan. 17, 2012 for International Application No. PCT/IB2010/053285.
(Continued)

*Primary Examiner* — Gregory F Cunningham
(74) *Attorney, Agent, or Firm* — Jones Robb, PLLC

(57) ABSTRACT

The present invention relates to a security element (1), comprising: an optical system, comprising: a transparent or translucent substrate (2), on the side of a first surface (2*a*, 2*b*) of the substrate (2) is a combined image (I) comprising a plurality of encoded interleaved images ($I_1$), a exposing screen (4) placed on top of the combined image, enabling the encoded images ($I_1$) to be observed during a change in the direction of observing the security element (1) relative to the optical system, the exposing screen (4) being: located on the side of the first surface (2*a*, 2*b*), the combined image then being located between the exposing screen (4) and the substrate (2), in which case the security element (1) comprises, on the side of the second surface (2*a*, 2*b*), a reflective surface that enables the encoded images ($I_1$) to be observed through exposing screen (4).

43 Claims, 6 Drawing Sheets

(56) References Cited

U.S. PATENT DOCUMENTS

Figure 1:
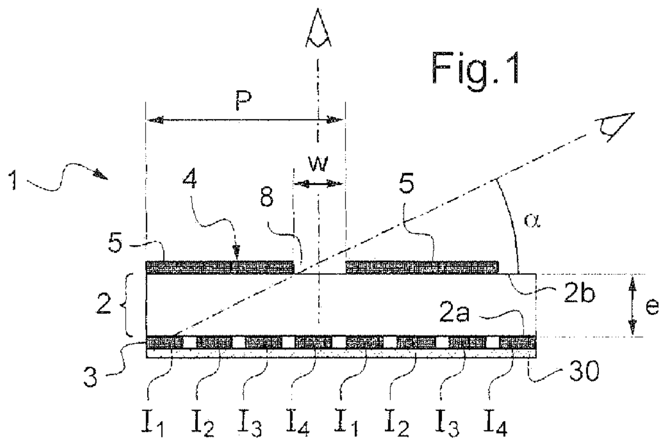

| | | | | |
|---|---|---|---|---|
| 3,154,872 | A | 11/1964 | Nordgren | |
| 3,241,429 | A | 3/1966 | Rice et al. | |
| 4,645,301 | A | 2/1987 | Orensteen et al. | |
| 4,892,336 | A * | 1/1990 | Kaule et al. | 283/91 |
| 5,098,302 | A | 3/1992 | Sekiguchi | |
| 5,118,526 | A | 6/1992 | Allen et al. | |
| 5,525,383 | A | 6/1996 | Witkowski | |
| 5,708,871 | A | 1/1998 | Hamada et al. | |
| 5,901,484 | A | 5/1999 | Seder | |
| 6,114,077 | A * | 9/2000 | Voets et al. | 430/97 |
| 6,286,873 | B1 | 9/2001 | Seder | |
| 6,494,491 | B1 | 12/2002 | Zeiter et al. | |
| 6,749,777 | B2 * | 6/2004 | Argoitia et al. | 252/582 |
| 6,833,956 | B2 * | 12/2004 | Lee | 359/567 |
| 6,856,462 | B1 | 2/2005 | Scarbrough et al. | |
| 7,922,209 | B1 * | 4/2011 | Beretta | 283/91 |
| 8,289,579 | B2 * | 10/2012 | Simske et al. | 358/3.28 |
| 2002/0182537 | A1 | 12/2002 | Furukawa | |
| 2003/0081258 | A1 | 5/2003 | Sugizaki | |
| 2003/0137145 | A1 | 7/2003 | Fell et al. | |
| 2004/0043203 | A1 | 3/2004 | Bogdanovic | |
| 2004/0071921 | A1 * | 4/2004 | Prater | 428/43 |
| 2004/0136038 | A1 * | 7/2004 | Holmes et al. | 359/15 |
| 2004/0169928 | A1 * | 9/2004 | Nilsen et al. | 359/529 |
| 2005/0040243 | A1 * | 2/2005 | Bi et al. | 235/492 |
| 2005/0089163 | A1 | 4/2005 | Lüthi | |
| 2005/0150964 | A1 | 7/2005 | Lo | |
| 2005/0161512 | A1 * | 7/2005 | Jones et al. | 235/487 |
| 2005/0183300 | A1 | 8/2005 | Seder | |
| 2005/0184504 | A1 | 8/2005 | Alasia et al. | |
| 2006/0003295 | A1 | 1/2006 | Hersch et al. | |
| 2006/0280331 | A1 * | 12/2006 | Chosson et al. | 382/100 |
| 2006/0290136 | A1 | 12/2006 | Alasia et al. | |
| 2007/0108386 | A1 * | 5/2007 | Krul et al. | 250/339.1 |
| 2007/0108486 | A1 | 5/2007 | Hara et al. | |
| 2007/0279697 | A1 | 12/2007 | Widmer Gomres et al. | |
| 2008/0067801 | A1 | 3/2008 | Schilling et al. | |
| 2008/0284157 | A1 | 11/2008 | Muke et al. | |
| 2009/0008458 | A1 | 1/2009 | Vast et al. | |
| 2009/0186205 | A1 | 7/2009 | Doublet et al. | |
| 2010/0053691 | A1 * | 3/2010 | Kuyper-Hammond et al. | 358/3.28 |
| 2010/0253063 | A1 * | 10/2010 | Skogster | 283/100 |
| 2012/0001411 | A1 | 1/2012 | Rosset | |
| 2012/0025514 | A1 * | 2/2012 | Camus | 283/67 |

FOREIGN PATENT DOCUMENTS

| | | | | |
|---|---|---|---|---|
| DE | 102006061905 | | 7/2008 | |
| EP | 0 203 499 | | 12/1986 | |
| EP | 0 229 645 | | 7/1987 | |
| EP | 0 967 091 | | 12/1999 | |
| EP | 1 527 901 | A1 | 10/2003 | |
| EP | 1 580 025 | A2 | 3/2005 | |
| EP | 1652687 | A1 * | 5/2006 | B42D 15/00 |
| EP | 2 123 470 | A1 | 11/2009 | |
| GB | 1 552 853 | | 9/1979 | |
| WO | WO 94/27254 | | 11/1994 | |
| WO | WO 97/47478 | | 12/1997 | |
| WO | WO 0217242 | A1 | 2/2002 | |
| WO | WO 2004/034313 | A1 | 4/2004 | |
| WO | WO 2004/096482 | | 11/2004 | |
| WO | WO 2005/052650 | | 6/2005 | |
| WO | WO 2005/058610 | | 6/2005 | |
| WO | WO 2006029744 | A1 | 3/2006 | |
| WO | WO 2006/051231 | | 5/2006 | |
| WO | WO 2006/125224 | A2 | 11/2006 | |
| WO | WO 2007/020048 | | 2/2007 | |
| WO | WO 2007127862 | A2 | 11/2007 | |
| WO | WO 2008/006983 | | 1/2008 | |
| WO | WO 2008/080619 | A1 | 7/2008 | |
| WO | WO 2011/007342 | | 1/2011 | |
| WO | WO 2011/007343 | | 1/2011 | |
| WO | WO 2011/007344 | | 1/2011 | |

OTHER PUBLICATIONS

Preliminary Search Report and Written Opinion for French Priority Application No. 0955002 dated Mar. 12, 2010.

International Search Report dated Nov. 5, 2010 and Written Opinion dated Jan. 17, 2012 for International Application No. PCT/IB2010/053286.

Preliminary Search Report and Written Opinion for French Priority Application No. 0955003 dated Mar. 12, 2010.

International Search Report dated May 11, 2010 and Written Opinion dated Jan. 17, 2012 for International Application No. PCT/IB2010/053284.

Preliminary Search Report and Written Opinion for French Priority Application No. 0955003 dated Apr. 19, 2010.

Co-pending U.S. Appl. No. 13/384,529 (not yet published), filed as U.S. National Stage of International Application No. PCT/IB2010/053285 (Published as WO 2011/007343) on Apr. 6, 2012.

Co-pending U.S. Appl. No. 13/384,561 (not yet published), filed as U.S. National Stage of International Application No. PCT/IB2010/053286 (Published as WO 2011/007344) on Apr. 2, 2012.

International Search Report of International Application No. PCT/182009/055934; dated Jul. 19, 2010.

French Search Report of French Application No. 08 59017, to which PCT/182009/055934 claims priority; dated Aug. 5, 2009.

Written Opinion of International Application No. PCT/182009/055934. Aug. 5, 2009.

Notification of Opposition (Giesecke & Devrient), European Application No. 2454054 mailed Mar. 7, 2014.

Notification of Opposition (De La Rue International Limited), European Patent No. 2454054 mailed Feb. 26, 2014.

Office Action dated Dec. 30, 2013 from U.S. Appl. No. 13/384,561.

Office Action dated Oct. 29, 2013 from U.S. Appl. No. 13/384,529.

Restriction Requirement dated Nov. 12, 2013 from U.S. Appl. No. 13/384,561.

* cited by examiner

Fig.11
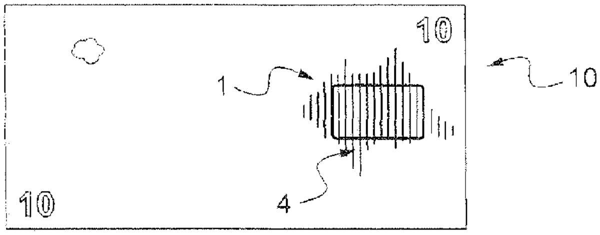
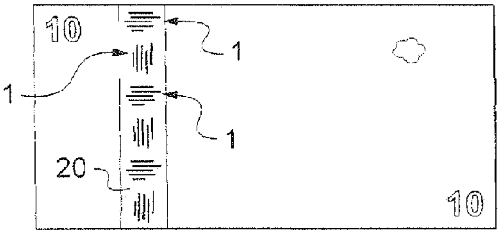
Fig.12
Fig.13A
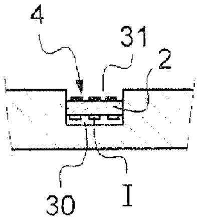
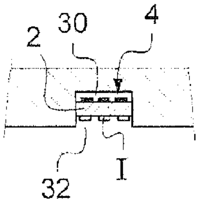
Fig.13B
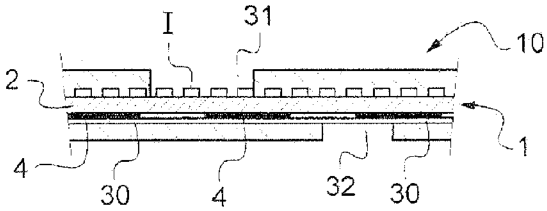
Fig.13C
Fig.14A
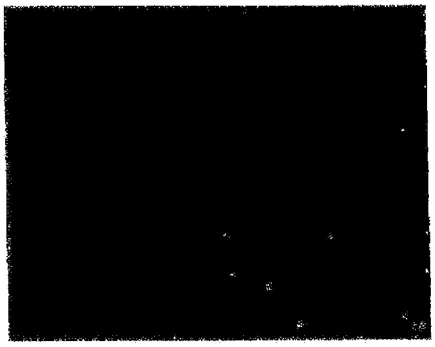
Fig.14B
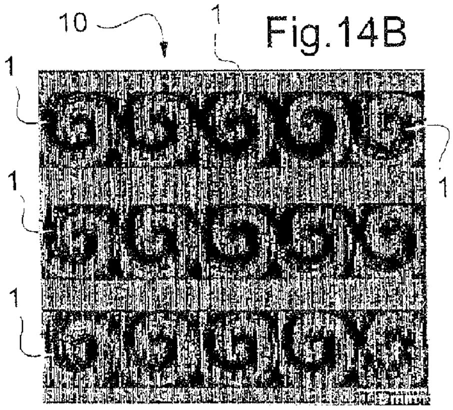

PARALLAX EFFECT SECURITY ELEMENT

This is a national stage application under 35 U.S.C. §371 (c) of PCT/IB2010/053284, filed internationally on Jul. 19, 2010, which claims priority to French Application No. 0955000, filed in France on Jul. 17, 2009, the entire contents of both of which are incorporated by reference herein.

The present invention pertains to the field of security elements serving for the authentication and/or identification of articles, documents or diverse objects.

BACKGROUND

In order to guard against forgeries or falsifications and to increase the level of security, it is known to use security elements applied at the surface or introduced in the bulk or as window(s) in a security article, especially a security document, or other object, for example a label, packaging, especially for medicines, foods, cosmetics, electronic parts or spare parts.

The security article can especially be chosen from among a payment means, such as a banknote, a restaurant voucher or ticket, an identity document such as an identity card, a visa, a passport or a driver's license, a lottery ticket, a transport pass or else an entry ticket for shows.

The exposure of images animated by a parallax effect has been known for a great many years.

Several patents relying on this principle have been filed, for example U.S. Pat. No. 5,098,302, U.S. Pat. No. 5,525,383 and U.S. Pat. No. 6,286,873.

Methods are known for creating illusions of motion such as are described in the documents U.S. Pat. No. 5,901,484 and U.S. Pat. No. 6,286,873 using a carrier support bearing several coded images, corresponding for example to the decomposition of the motion of an object or of an animal, and a carrier transparent film bearing an array of parallel lines, placed on the support. A relative motion between the coded images and the array of parallel lines makes it possible to create the illusion of a motion.

U.S. Pat. No. 6,286,873 teaches the possibility of observing coded images on each side of an optical system comprising an exposure screen and a combined image, situated on either side of a substrate. This document does not disclose a security element.

Furthermore, diverse other optical systems are known through the publications U.S. Pat. No. 3,241,429, U.S. Pat. No. 3,154,872, U.S. Pat. No. 4,645,301, U.S. Pat. No. 4,892,336, WO 94/27254, U.S. Pat. No. 6,856,462, US 2005/184504, U.S. Pat. No. 5,708,871, WO 2005/052650, WO 2005/058610, US 2005/150964 and WO 2007/020048.

It is known to produce security elements with lenticular arrays associated with specific prints, so as to produce motion effects. The company SECURENCY markets some under the MOTION® brand.

US 2007/0279697 discloses a security element comprising an optical system making it possible to produce a moiré pattern effect.

SUMMARY

A need exists to benefit from security elements comprising an optical system capable of producing optical effects that can contribute to the authentication or the identification of an article or object, and whose possible incorporation into an article or object such as a piece of paper can be done relatively easily.

The subject of the invention is, according to a first of its aspects, a security element, comprising:

an optical system, comprising:

- a transparent or translucent substrate,
- on the side of a first face of the substrate a combined image comprising a plurality of interleaved coded images,
- an exposure screen overlaid on the combined image, making it possible to observe the coded images upon a change of the direction of observation of the security element in relation to the optical system, the exposure screen being:

- situated on the side of a second face of the substrate, opposite from the first face, the optical system then comprising a background placed in such a way that the exposure screen is between the background and the substrate or that the combined image is between the background and the substrate, or,

- situated on the side of the first face, the combined image then being situated between the exposure screen and the substrate, in which case the security element comprises on the side of the second face a reflecting surface making it possible to observe the coded images through the exposure screen.

The combined image can comprise at least two interleaved coded images. Preferably, it comprises at least three interleaved coded images so as to accentuate the visual animation effect during successive observations of the coded images by changing the direction of observation of the security element in relation to the optical system.

The exposure of the coded images can be done by parallax effect.

The invention offers new possibilities of authenticating and/or identifying an article or object bearing the security element, for example a security document.

The user can, by varying the inclination of the optical system, reveal a succession of images, thereby making it possible to create an animation effect for example.

The exposure screen can allow the human eye to view a different coded image at one and the same time, the brain of the observer being able to reconstruct for example a motion or to observe hidden information.

The security element can afford anti-photocopying security. In particular, the fineness of the exposure screen and/or of the combined image, especially less than 200 nm, can prevent reproduction by photocopying and also ensure protection against the use of scanners.

The resolution of the combined image and/or of the exposure screen may be directly related to the thickness of the substrate. It may be greater than or equal to 800 dpi, preferably greater than 2000 dpi and more preferably greater than 3000 dpi.

The exposure screen and/or the combined image may be as such of homogeneous aspect to the naked eye, having regard to its fineness. In particular, the exposure screen can appear to the naked eye as having a uniform aspect, especially color.

In the invention, the various images that the observer can see are other than images resulting from a phenomenon of spatial interference between two overlaid arrays, stated otherwise a moiré pattern effect. Such an effect can result from a shifted orientation of the overlaid arrays by a nonzero specific angle and can disappear when the arrays are exactly overlaid or are shifted by an angle different from the specific angle. The invention seeks preferably to avoid such an effect. The switch from the observation of one coded image to another when the angle of observation varies can be performed without progressive transition.

The observation of the coded images may be facilitated and improved by the presence of the background.

Indeed, observation in the presence of the background can allow the appearance of a contrast effect between the background, the combined image and the exposure screen. This may involve a contrast of color arising in particular from the use of a combined image, an exposure screen and a background of different colors. It may also involve an animated image/fixed background contrast, for example arising from the use of a background representing a fixed image, especially a landscape or a fixed image similar to one of the images constituting the animation. The background thus sets "the animation effect", described hereinafter, into relief.

The background may be non-reflecting. The background can exhibit at least one face facing the exposure screen or the combined image which is plane.

Furthermore, the combined image and the exposure screen may or may not have the same color, and the background may be of another different color, being darker especially.

Furthermore, the background can be brighter than the combined image and/or the exposure screen.

The coded images may be observable from the side of a single face of the substrate or from both sides of the faces of the substrate when the background is non-opaque.

The color of the observed coded images can correspond to the color of the combined image or result from the combination of the colors of the combined image and of the background, for example.

The background may be printed, for example by offset, copper-plate, laser, silk-screen printing, inter alia.

The background can comprise luminescent dyes and/or pigments, especially phosphorescent and/or fluorescent, and/or interferential pigments, especially iridescent, and/or liquid-crystal pigments and/or photochromic or thermochromic pigments, especially in printed form or incorporated into the background.

The color of the background may be visible to the naked eye, under ultraviolet (UV) and/or infrared (IR) light.

Advantageously, the background can comprise a luminescent agent, for example phosphorescent and/or fluorescent. It may thus be possible to observe a particular effect under predefined lighting, for example UV or IR.

The luminescent agent may be fluorescent or phosphorescent under UV and/or under IR. The luminescent agent may for example be a luminescent pigment, especially a fluorescent or phosphorescent pigment.

The background might not be transparent but be at least in part, especially totally, translucent or opaque.

The background may or may not be opaque. The background may for example be colored and non-opaque.

The background may be at least partially metallized. The background may especially comprise a metal layer with possible demetallizations.

The metal layer may comprise recesses or zones of zero thickness. The metal layer may be discontinuous. The metal layer may thus comprise a plurality of metallic patterns.

The metal may be chosen for example from among silver, aluminum, nickel, cobalt, tin, gold, copper, and from among the alloys of metals, especially such as brass or bronze.

The term metal is understood to mean also any dielectric material. Dielectric structures with mirror effect can consist of an alternation of layers of high and low index, for example respectively Hafnium dioxide and Silicon dioxide, and can especially be obtained by ion etching.

The metal may be deposited on the background by any deposition method known from the prior art. In particular, the metal may be deposited by chemical deposition or a vacuum deposition technique. The metal deposition may for example be carried out by cathodic sputtering.

The metal deposition may be performed by any type of printing that can use metallic inks, for example offset, copper-plate, laser, heliogravure or silk-screen printing.

The deposition of the metal may be performed with a desired pattern with the aid of a mask directly on the substrate.

The metal layer may as a variant be obtained with the desired pattern by partially demetallizing the substrate previously metallized according to dots or screens having an appropriate density. The demetallization can be performed for example by chemical attack or by removal of metallic particles rendered non-adherent, especially by means of a laser.

The metal layer may for example exhibit a thickness of greater than 150 Å, especially lying between 200 and 1000 Å.

Advantageously, the background belongs to the security element.

The background may be secured to the optical system of the security element, especially the combined image or the exposure screen, by gluing, back-gluing, thermo-reactivatable coating, inter alia.

The background may furthermore be printed on the exposure screen or on the combined image.

The background may have the same dimensions, especially the same width and the same length, as those of the optical system, especially as those of the combined image or of the exposure screen. The background may furthermore have different dimensions. For example, the background may be wider and/or longer than the optical system, especially than the exposure screen or the combined image.

The background may be overlaid partially or totally on the optical system, especially on the exposure screen or on the combined image.

The background may or may not be continuous. The background may extend entirely or only zone-wise over the combined image or the exposure screen.

The invention may in particular make it possible to secure security articles especially security documents, including papery fibers, such as banknotes or passports, with security elements having a relatively low thickness. The use of a relatively fine substrate, for example less than or equal to 30 μm in thickness, may require the utilization of printing or marking systems of very significant definition, further increasing the degree of security.

The coded images can represent hidden items of information, exposed successively by changing the angle of observation of the optical system. The security element may be configured to allow the observation of the succession of several images when the direction of observation changes, this also being called the "animation effect". Within the framework of the invention, the term "animation" has to be understood in the broad sense. It may involve several images of one and the same object, representing different angles of view, so as to afford a 3D or relief effect, rather than a motion effect. The combined image may correspond to the decomposition of the motion of a pattern, for example of a text, of alphanumeric signs, of ideograms, of an object, of a person and/or of an animal. The coded images (also more simply called interleaved images) may represent successive steps of the motion of a pattern, for example of an object, of a person and/or of an animal.

The exposure screen can have a contour of arbitrary shape, for example circular, oval, star-shaped, polygonal, for example rectangular, square, hexagonal, pentagonal or lozenge-shaped, inter alia.

The contour of the exposure screen may for example represent a text, an alphanumeric sign, an ideogram, an object, a person and/or an animal.

Advantageously, the optical system may figure in a window of a security document, the window being at least partially transparent or translucent or formed by missing material, for example the local absence of paper above or below the optical system.

Exemplary embodiments of windows in security documents are for example described in GB 1 552 853 which discloses the creation of a window especially by transparentization, laser cutting, mechanical abrasion or incision, EP 0 229 645 which describes the creation with the aid of masks of a window on one face or on both faces of a twin-ply paper, WO 2004/096482 which describes the creation of a window by laser cutting, CA 2 471 379 which describes the creation of a transparent window and association with a security element and WO 2008/006983 which describes the creation of a transparent window on a twin-ply paper.

The window may go right through and the security element may be at least partially situated in the window. Observation of the coded images may be done either from the recto side or from the verso side of the window.

When the security element is incorporated as windows in an article, either in a through window, or appearing alternately on the side of a first face of the article and on the side of a second face of the article, for example opposite from the first face, the background may be disposed alternately on either side of the security element so that the interleaved images and/or the exposure screen are observable at one and the same time from the first face of the article and from the second face of the article.

The combined image and/or the exposure screen may be brought to the substrate via a printing method, for example offset, copper-plate, laser, heliogravure or silk-screen printing. For example, the combined image and/or the exposure screen may or may not be printed with colored inks, visible to the naked eye, under ultraviolet (UV) and/or infrared (IR) light, may be opaque or luminescent, especially fluorescent, thermochromic, photochromic, with interferential effect, especially iridescent, or with optically variable effect according to the angle of observation (goniochromatic), especially comprising liquid crystals, metallic or otherwise, magnetic or otherwise, inter alia. The combined image and/or the exposure screen can furthermore comprise metallizations and/or demetallizations, of for example aluminum. Metallizations and/or demetallizations may be used to avoid forgery by printing. Metallizations and/or demetallizations may further be used when the security element is incorporated into a security document, especially of the security thread type. When a magnetic ink is used, the pattern drawn can constitute a magnetic signature allowing additional authentication of the substrate by detection of said signature.

The combined image and/or the exposure screen may further be printed with liquid crystals, in such a way that the coded images are for example visible only through a polarizer.

The optical system may be carried by a patch and/or a foil. The patch and/or the foil can comprise metallizations and/or demetallizations, for example aluminum, or all types of prints. The optical system may further be carried by a security thread, incorporated at the surface, in the bulk or as window(s) in the security document. The width of the security thread lies for example between 3 and 20 mm, being for example equal to about 4 mm.

The substrate of the optical system can comprise or consist of a thermoplastic material, for example a polyolefin, for example polyethylene (PE), polyvinyl chloride (PVC), polyester, polyethylene terephthalate (PET), polycarbonate (PC), polyester carbonate (PEC), polyethylene terephthalate glycol (PETG), acrylonitrile butadiene styrene (ABS) or a light-collecting film for example of the “waveguide” type, for example a luminescent film based on polycarbonate marketed by the company BAYER under the name LISA®.

The substrate may comprise cellulose fibers and especially paper. In particular, the substrate may be a sufficiently translucent paper to make it possible to expose the coded images, especially a tracing paper.

The substrate can also be transparentized by application of a composition, generally fatty, which transparentizes it in a permanent manner, for example a composition made of oil and of transparent mineral material, as described in U.S. Pat. No. 2,021,141, or for example a composition in the form of a wax combined with a solvent, as described in U.S. Pat. No. 1,479,437.

It is also possible to transparentize the substrate by applying a wax locally by hot transfer, as described in U.S. Pat. No. 5,118,526.

Furthermore, it is possible to use for the substrate a fibrous layer comprising a thermofusible material, for example polyethylene, as described in patent EP 0 203 499, which under the local action of heat will see its transparency vary.

The exposure screen may be situated on the side of the second face of the substrate, therefore opposite from the combined image. As a variant, the exposure screen may overlap the combined image on the side of the first face of the substrate and the optical system may comprise a reflecting surface on the side of the second face.

This reflecting surface is for example formed by a metallization of the second face of the substrate. It entails for example a metal deposition 200 Å in thickness or with a refractive index sufficient to cause a reflection.

Authentication and/or identification can be done by observing the recto or verso face of the security element.

In particular when the exposure screen and the combined image are present respectively on either side of the substrate, it is possible to produce the background with a sufficiently low opacity so that the coded images may be observed in reflection on the recto side, which coincides for example with the side of the exposure screen, but also on the verso side. When the security element is integrated into a security document, for example as windows, it may be advantageous for the recto and verso sides of the security element to be rendered observable at one and the same time.

The background, the exposure screen and/or the combined image may be colored. This coloration is for example a plain or dim color, especially a gray tint. According to another variant of the invention, the background exhibits a reflecting and/or metallic effect, and this may make it possible to afford the security element clarity or brightness.

According to another variant, the background is configured to exhibit an optically variable effect, especially an effect dependent on the illumination or on the angle of observation, this effect being for example obtained by virtue of one or more fluorescent or phosphorescent compounds or by virtue of liquid crystals. The optically variable effect can furthermore be obtained by virtue of a diffractive structure, such as a hologram.

The background can represent a pattern, for example a word, initials, a code, a symbol, an image, an alphanumeric character or an ideogram. The pattern may be observable in transmitted light, especially from the verso of a security document with which the security element is integrated, and this may make it possible to constitute an additional way of securing the security document.

Such a pattern, especially when it is observable in reflection, may make it possible to highlight a motion effect between two combined images of the security element.

It may be advantageous, especially, to produce the exposure screen and/or the combined image each with at least two overlaid colors, in such a way that on the verso side the coded images are observed in a first color and on the recto side in a second color.

The exposure screen and/or the combined image may be monochromatic or polychromatic. In particular, at least one coded image of the combined image may be monochromatic or polychromatic. The interleaved coded images may furthermore be produced at least in part with thermochromic and/or photochromic inks. In this way, only a part of the coded images may for example be observable under predefined conditions of lighting and/or temperature.

The combined image and/or the exposure screen may be produced with different colors. In this way, it may be possible to obtain a colored animation effect during the observation of the coded images.

The use of color to produce the security element can enable an article integrating such a security element to be made yet more secure. Most printers use the quadrichrome technique with the colors “black”, “cyan”, “magenta” and “yellow”. A photocopier of maximum resolution equal to 1200 dpi can reproduce a black combined image for which the width of a line of a coded image is 21 μm or more. However, to reproduce the colors, especially the different colors of black, cyan, magenta or yellow, this photocopier uses cyan, magenta and yellow screens. The maximum effective resolution of this photocopier when reproducing a combined image is thus estimated at about 1200/3=400 dpi. Such a resolution corresponds to a combined image for which the width of a line of a coded image is 63 μm or more. Increasing the resolution of the screen and the combined image and/or the use of color can thus make it possible to increase the level to which the security element is made secure.

For example, all the interleaved coded images of the combined image may have the same color and the exposure screen a different color. As a variant, the interleaved coded images of the combined image may have different colors and the exposure screen a different color from those of the interleaved coded images or similar to the color of at least one of the interleaved coded images.

The background may have the same color as the exposure screen or the same color as at least one of the interleaved coded images. The background may furthermore have a different color from those of the interleaved coded images and the exposure screen.

The exposure screen and/or the combined image may or may not be opaque. In particular, the exposure screen and/or the combined image may be at least partially translucent or transparent and for example colored or absorbent at a given wavelength in the UV or IR.

The security element may furthermore comprise two exposure screens associated respectively with two combined images, the orientation of the strips of one of the exposure screens being different from that of the other exposure screen. When the strips are non-rectilinear, their orientation is defined by the general direction in which they extend.

The security element may or may not comprise two juxtaposed exposure screens, overlaid or not, comprising strips having different or the same orientations. One of the exposure screens may be totally or partially surrounded by the other exposure screen.

The possible zone of overlay of the exposure screens may reveal a cross-grid shape when the strips of the exposure screens have different orientations.

The thickness of the substrate lies for example between 10 μm and 1 mm, especially between 6 μm and 1 mm, preferably between 6 μm and 300 μm, preferably between 10 and 100 μm, lying for example between 30 μm and 50 μm. It may furthermore be less than 50 μm, especially than 25 μm. The period of the exposure screen and/or of the combined image is preferably less than or equal to the thickness of the substrate.

A security element with a resolution of the combined image and/or of the exposure screen greater than or equal to 800 dpi, as well as a substrate thickness and a relation between period of the exposure screen and/or of the combined image and thickness of the substrate such as hereinabove may make it possible to obtain an animation visible to the naked eye, despite the fineness of the screen and of the combined image, and enhance the security of the device in relation to photocopies of the latter.

The number of interleaved coded images lies for example between 2 and 15, especially between 2 and 5, being preferably greater than or equal to 3. The distance between two constituent elements of one and the same coded image can lie between 2 μm and 1 mm, especially between 10 μm and 1 mm, being preferably substantially equal to the period of the exposure screen. The width of a constituent element of a coded image is preferably less than or equal to 500 μm, better 100 μm. The width of an opacifying strip of the exposure screen is preferably less than or equal to the thickness of the substrate, especially 1 mm.

The exposure screen can comprise opacifying strips with parallel edges, optionally non-rectilinear. The presence of opacifying strips with non-rectilinear edges may make it more difficult for a counterfeiter to reproduce the optical system.

The exposure screen and/or the combined image may be devoid of metal layer.

The security element may furthermore comprise an exposure screen comprising at least one first fluorescent zone capable of emitting by fluorescence, in a predefined lighting condition, visible light of a first color, and a combined image comprising at least one second fluorescent zone capable of emitting by fluorescence, under the predefined lighting condition, visible light of a second color, different from the first, at least one of the first and second fluorescent zones, especially both, being at least partially opaque, at least under the predefined lighting condition, and the first and second fluorescent zones being overlaid at least partially in such a way that, under the predefined lighting condition, light passing successively through the two fluorescent zones exhibits a third color different from the first and second colors. In particular, the security element may use the principle described in international application WO 2006/051231. The predefined lighting condition may especially correspond to ultraviolet lighting, especially of wavelength close to the visible or to infrared lighting, according to the fluorescent compounds used. At least one of the first and second fluorescent zones, especially both, may be substantially colorless in white light.

The security element can comprise a plurality of optical systems associated with different directions of observation. For example, the security element can comprise an alternation of optical systems associated with two respective perpendicular directions, especially optical systems whose respective exposure screens have perpendicular orientations.

The security element may be overlapped totally or in part by a material invisible under “normal” illumination, that is to say when illuminated by daylight or an artificial light source. This material invisible under normal illumination is for example a material visible, under a specific illumination, especially a luminescent material, for example a fluorescent or phosphorescent material visible under UV or IR illumination.

As a variant, the material can comprise visible nematic liquid crystals on a reflecting background (the screen and/or the image and/or the background then being reflecting) with a polarizing filter, especially circular.

The total or partial coverage of the security element by a material such as this which is invisible under “normal” illumination can afford additional security in the form of a pattern, for example of a word, initials, code, symbol, image, alphanumeric character or ideogram.

As a variant, said material invisible under “normal” illumination does not overlap the security element but is disposed between the screen and the image, then being observable partially but in a sufficient manner.

The use of a material invisible under “normal” illumination can thus confer additional security of second level upon the security element, a security element of second level being defined later.

The subject of the invention is furthermore, according to another of its aspects, a security article, especially a security document, incorporating a security element such as defined hereinabove. Such a security article can incorporate papery fibers. The recto and verso faces of the security element may advantageously be observable.

The subject of the invention is furthermore, according to another of its aspects, a security article, especially a security document, comprising a security element comprising an optical system, comprising:

- a transparent or translucent substrate,
- on the side of a first face of the substrate a combined image comprising a plurality of interleaved coded images,
- an exposure screen situated on the side of a second face of the substrate, opposite from the first face, overlaid on the combined image, making it possible to observe the coded images upon a change of the direction of observation of the security element in relation to the optical system, the substrate of the security article overlapping at least partially the combined image and/or the exposure screen of the security element.

The substrate of the security article may advantageously constitute a background for the security element such as described previously.

In particular, the substrate can comprise, especially at the level of the region of overlay on the exposure screen and/or on the combined image, properties analogous to those described previously for the background of the security element.

The security element can thus be devoid of background such as described previously on account of the presence of the substrate of the security article.

The security article may furthermore comprise a perforation in which the security element is at least partially placed, the latter corresponding for example to the juxtaposition of two sub-elements, especially in the form of foils or patches, comprising respectively an exposure screen and the corresponding combined image.

The sub-elements can overlap at least partially the edges of the perforation, with or without thickness compensation.

The security article may furthermore comprise an exposure screen or a combined image produced in the form of prints and a sub-element, especially in the form of a foil or patch, overlapping at least partially the prints formed, the sub-element comprising the combined image or the corresponding exposure screen. The prints of the combined image may for example be produced on the surface of the security article.

The or each sub-element may comprise a transparent or translucent substrate.

The or each sub-element, especially the patch or the foil, may be incorporated into the security article by gluing or by incorporation into the fibrous substrate of the article during its manufacture.

The subject of the invention is furthermore, according to another of its aspects, a method for manufacturing a security article such as defined hereinabove, the screen being formed by printing of the article whereas the substrate of the security element is present on the article.

The subject of the invention is furthermore, according to another of its aspects, a security article, especially a security document, in which the exposure screen, or preferably one or more coded images (coded image or original image before coding), is produced with a pattern, for example wavy opacifying strips, and the same pattern is produced elsewhere on the document.

The subject of the invention is furthermore a method for authenticating a security element, comprising the step consisting in observing the security element while varying the direction of observation of the optical system and in concluding as to the authenticity of an article or object associated with the security element as a function of the images observed. The observation may for example be done from recto and verso sides of the substrate.

The article or object, or else the security element especially in the form of a security thread, patch or foil, can comprise one or more other security elements, such as defined hereinafter.

Generally, among the security elements, some are detectable with the naked eye, in daylight or in artificial light, without using a particular apparatus. These security elements comprise for example colored fibers or bands, totally or partially metallized or printed threads. These security elements are termed first level.

Other types of security elements are detectable only with the aid of a relatively simple apparatus, such as a lamp emitting in the ultraviolet (UV) or the infrared (IR). These security elements comprise for example fibers, bands, strips, threads or particles. These security elements may be visible to the naked eye or otherwise, being for example luminescent under lighting from a Wood lamp emitting in a wavelength of 365 nm. These security elements are termed second level.

Other types of security elements furthermore require for their detection a more sophisticated detection apparatus. These security elements are for example capable of generating a specific signal when they are subjected, simultaneously or otherwise, to one or more sources of exterior excitation. Automatic detection of the signal makes it possible to authenticate, if appropriate, the document. These security elements comprise for example tracers taking the form of active materials, particles or fibers, capable of generating a specific signal when these tracers are subjected to an optronic, electrical, magnetic or electromagnetic excitation. These security elements are termed third level.

The security elements present within the security article can exhibit security characteristics of first, second and/or third level.

According to a particular variant of the invention, the security element comprises a print fluorescent under UV illumination. The first-level security afforded by the security element according to the invention is thus supplemented with a second-level security, especially a pattern, observed under UV illumination.

The optical system can comprise at least two combined images and a single screen making it possible, upon a change of the angle of observation, to successively observe the interleaved images of the two combined images. The two combined images may be disposed in such a way that a relative motion of an image combined with the other is perceived by a user upon a change of the direction of observation of the security element in relation to the optical system.

The substrate can comprise at least two distinct layers and the optical system can comprise at least two combined images, one of them being disposed facing, especially on, an external face of one of the layers of the substrate and the other combined image being disposed between the two layers.

The two layers of the substrate may exhibit the same thickness. These two layers may be transparent.

Each combined image can comprise a plurality of interleaved coded images.

Each combined image can comprise the same number of coded images and/or each combined image can have the same resolution, especially one of the resolution values mentioned hereinabove and/or the distance between two constituent elements of one and the same coded image of the first combined image may be equal to the distance between two constituent elements of one and the same coded image of the second combined image.

The subject of the invention is furthermore, according to another of its aspects, a security element comprising an optical system comprising:

- a transparent or translucent substrate,
- a first and a second combined image each comprising a plurality of interleaved coded image,
- a first and a second exposure screen overlaid respectively on the first and second combined images, the first exposure screen making it possible to observe the coded images associated with the first combined image in a first plane upon a first change of the direction of observation of the security element in relation to the optical system, and the second exposure screen making it possible to observe the coded images associated with the second combined image in a second plane upon a second change of the direction of observation of the security element in relation to the optical system.

The combined images may be situated on the side of a first face of the substrate.

The two exposure screens may be situated on the side of a second face of the substrate, opposite from the first face. The two exposure screens may as a variant be situated on the side of the first face of the substrate, the security element then comprising on the side of a second face of the substrate, opposite from the first face, a reflecting surface making it possible to observe the coded images through the exposure screens, the strips of the two exposure screens having a different orientation.

The subject of the invention is furthermore, according to another of its aspects, a security article comprising a security element such as defined hereinabove.

The two exposure screens having a different orientation, the strips of one of the exposure screens can be repeated in a first direction and the strips of the other exposure screen can be repeated in a second different direction.

The overlaying of the exposure screens can reveal a cross-grid shape.

The two exposure screens and/or the two combined images may be produced such as described previously.

In particular, the exposure screens can comprise strips with parallel edges, optionally non-rectilinear, for example wavy.

The exposure screens and/or the combined images may be printed or produced some other way, especially by metallization or demetallization. In particular, the exposure screens and/or the combined images may be produced by metallic or nonmetallic etching. The exposure screens and/or the combined images may be produced with different or the same metals.

The strips of the exposure screens may or may not be mutually perpendicular.

The pitch of the strips of the exposure screens may or may not be identical.

The exposure screens and/or the combined images may be produced with goniochromatic inks. In this way, it may be possible to create visual effects making it possible to see at the level of one and the same region from two different angles, coded images with different colors.

The exposure screens and/or the combined images may furthermore comprise photochromic and/or thermochromic inks. In particular, one exposure screen and/or one combined image may always be visible and the other exposure screen and/or combined image may be visible only under predefined conditions of lighting and/or temperature. The exposure screens and/or the combined images may be produced partially or totally with thermochromic and/or photochromic inks so as to allow observation of zones of the exposure screens and/or of the combined images only under predefined conditions of lighting and/or temperature.

The strips of the exposure screens may have a regular pitch, different or the same.

One of the exposure screens and/or one of the combined images may for example be formed on a different part of a security article from the part where the other exposure screen and/or combined image is situated, the overlaying of the two exposure screens and/or combined images being able to be performed by folding the article, especially security document.

The exposure screens and/or the combined images may or may not be situated in one and the same plane. For example, the exposure screens may be situated in two different planes and the combined images may also be situated in two other different planes. The exposure screens, respectively the combined images, may further be situated in one and the same plane, and the combined images, respectively the exposure screens, may be situated in two other different planes.

One of the exposure screens, respectively of the combined images, may be observable through a first polarizer, and the other exposure screen, respectively the other combined image, may be observable through a second polarizer. In particular, the use of polarizers is associated with exposure screens and/or combined images comprising liquid crystals. The person skilled in the art will choose in particular a structure suited to the effect sought, especially depending on whether he desires to observe the coded images, upon a change of the direction of observation of the security element in relation to the optical system, from just one or from both sides of the security element.

The coded images observable with one of the exposure screens may or may not be identical to the coded images observable with the other screen. In particular, the observation of identical images may afford additional security against an attempted falsification.

The exposure screens may be overlaid totally or partially.

The subject of the invention is furthermore, according to another of its aspects, a security element, comprising:

an optical system, comprising:

a transparent or translucent substrate comprising at least two layers, on the side of a first external face of the substrate a first combined image comprising a plurality of interleaved coded images, between the two layers of the substrate a second combined image comprising a plurality of interleaved coded images, an exposure screen overlaid on the combined images, making it possible to observe the coded images upon a change of the direction of observation of the security element in relation to the optical system, the exposure screen being:

situated on the side of a second face of the substrate, opposite from the first face, the optical system then comprising a background placed in such a way that the second combined image is between the background and the substrate.

Figure 2:
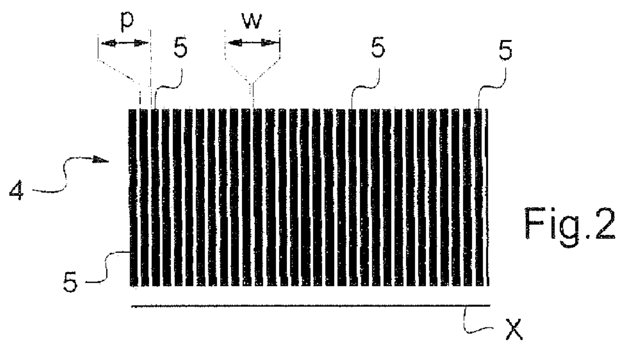
Figure 3:
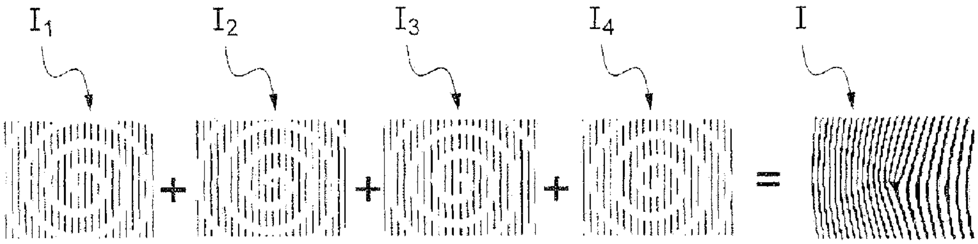
Figure 4:
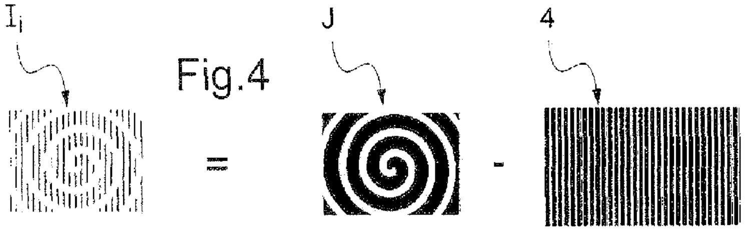
Figure 5:
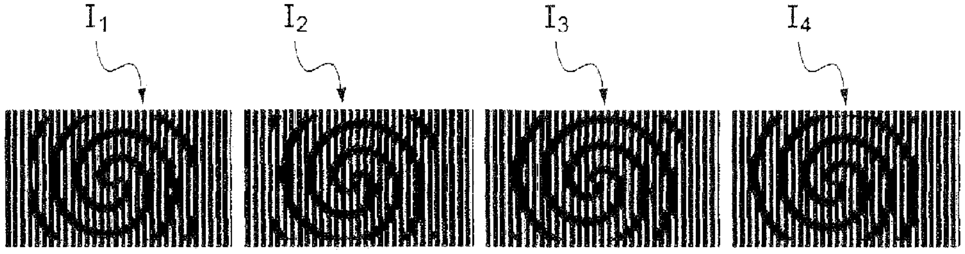
Figure 6A:
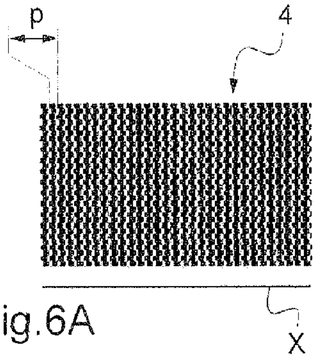
Figure 6B:
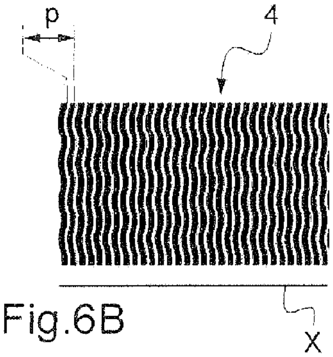
Figure 6C:
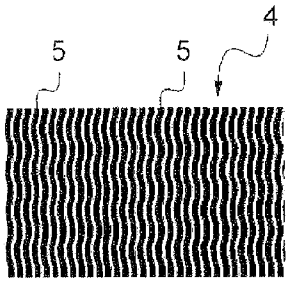
Figure 6D:
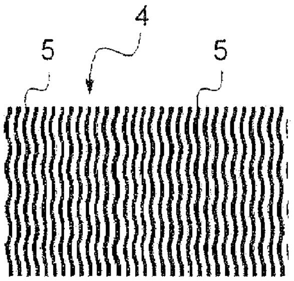
Figure 6E:
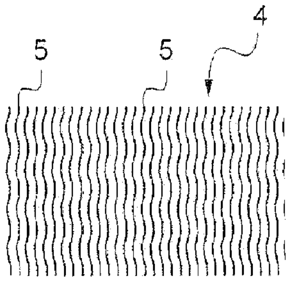
Figure 6F:
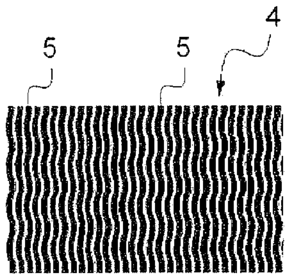
Figure 6G:
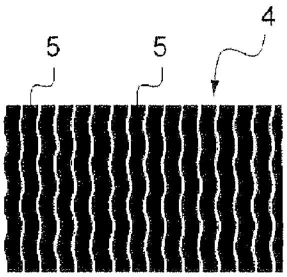
Figure 6H:
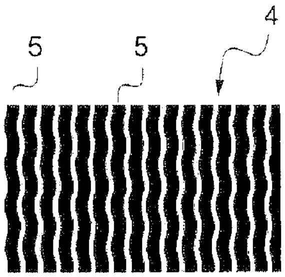
Figure 7:
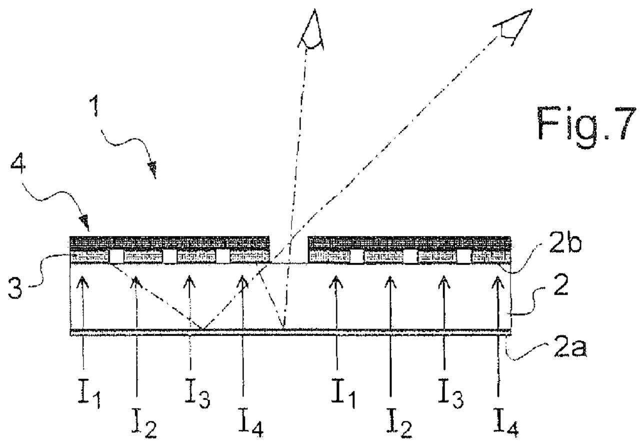
Figure 8:
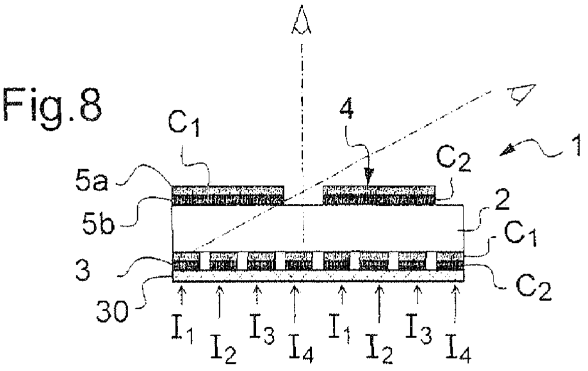
Figure 9:
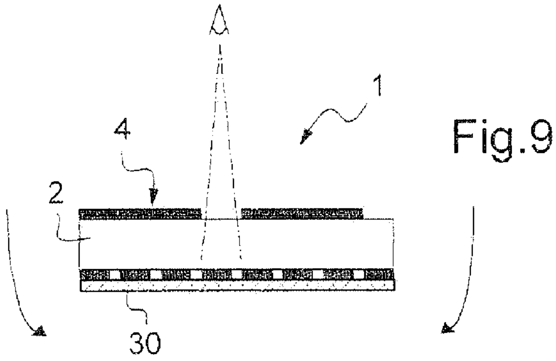
Figure 10:
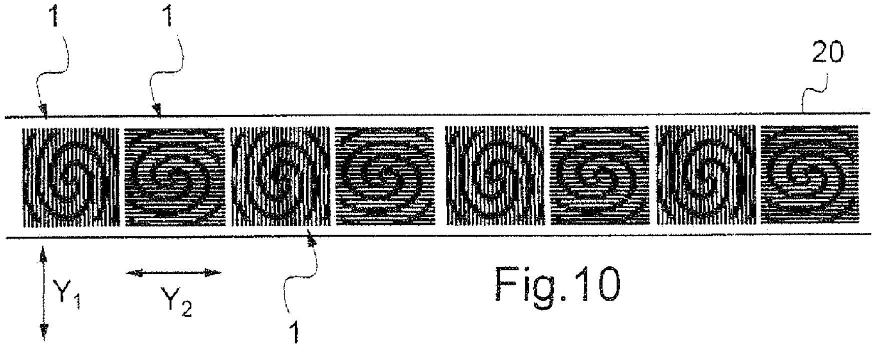
Figure 15:
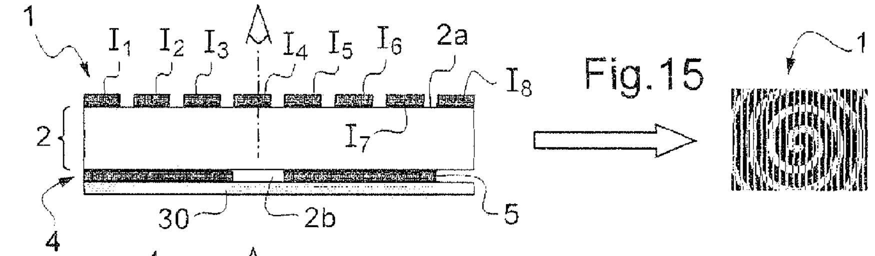
Figure 16:
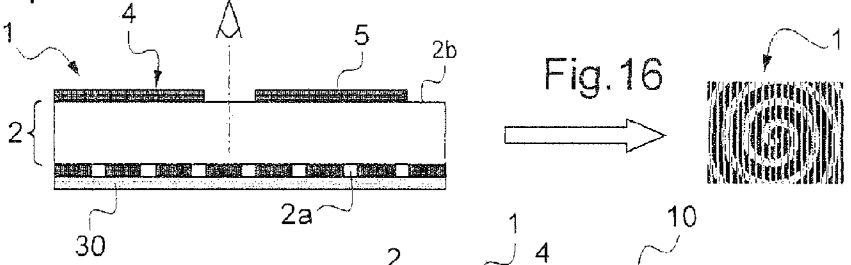
Figure 17:
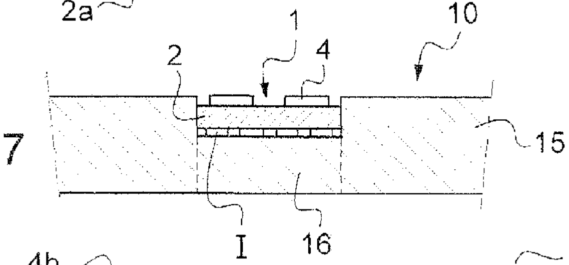
Figure 18:
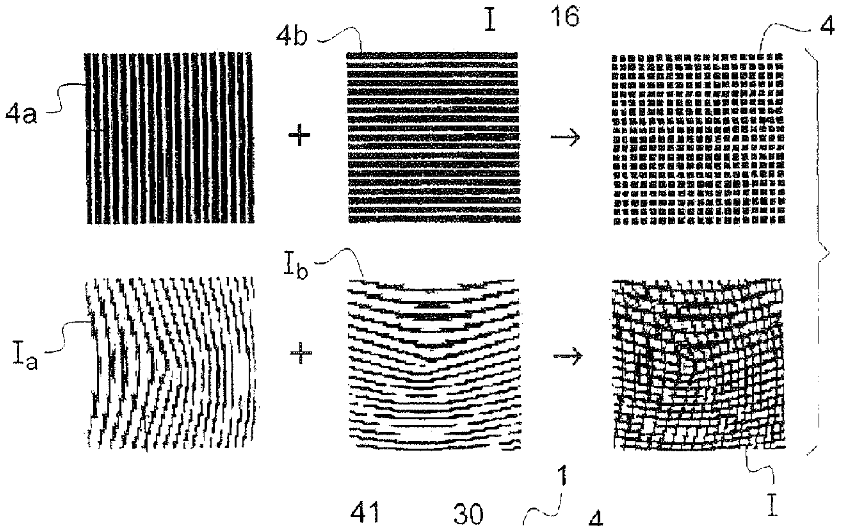
Figure 19:
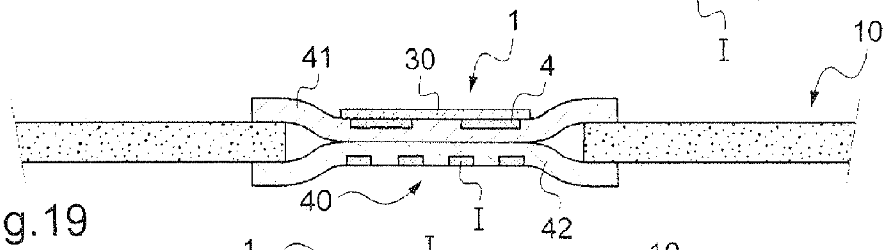
Figure 20:
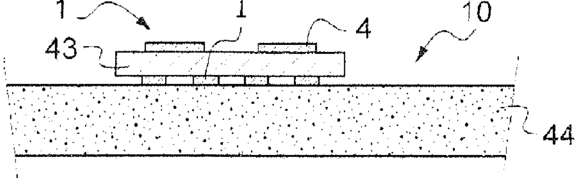
Figure 21:
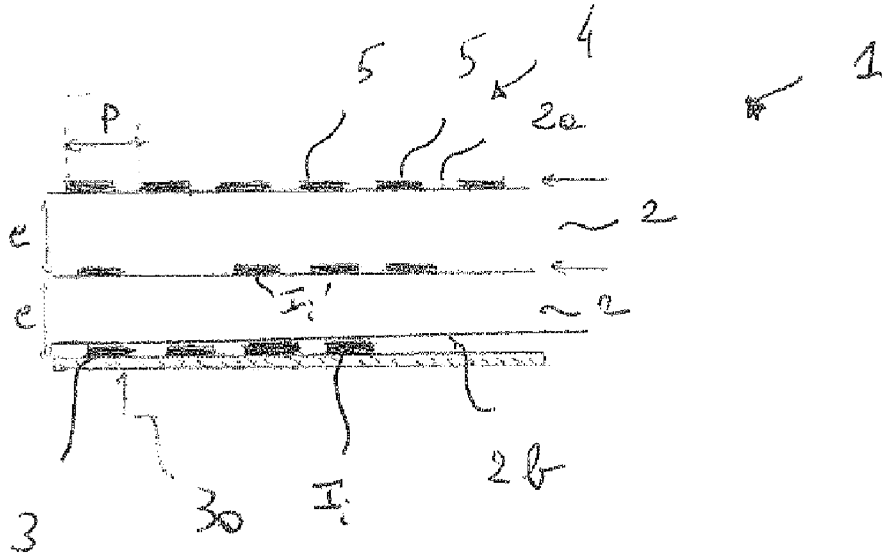

The invention may be better understood on reading the description which follows, of nonlimiting examples of implementation of the latter, and on examining the appended drawing in which:

FIG. 1 represents in section, in a schematic and partial manner, an exemplary optical system produced in accordance with an exemplary implementation of the invention, FIG. 2 represents, viewed face-on, at a magnified scale, an exemplary exposure screen, FIG. 3 illustrates the decomposition of the combined image into coded images, FIG. 4 illustrates the formation of a coded image, FIG. 5 represents a succession of coded images such as it may be observed when the angle of observation varies, FIGS. 6A to 6H represent other examples of exposure screens, FIGS. 7 and 8 are views similar to FIG. 1, of variant embodiments of optical systems, FIG. 9 illustrates the possibility of varying the inclination by deforming the substrate, FIG. 10 represents a security element comprising several optical systems corresponding to respective different directions of observation, FIGS. 11 and 12 represent two examples of security documents equipped with security elements according to the invention, FIGS. 13A, 13B and 13C represent exemplary security documents integrating security elements according to the invention, FIGS. 14A and 14B represent an exemplary security document comprising security elements according to the invention, respectively after photocopying and before photocopying, FIGS. 15 and 16 illustrate variants of observation of security elements according to the invention, FIG. 17 illustrates another exemplary security article according to the invention, FIG. 18 illustrates a variant embodiment of the exposure screen and of the combined image, FIGS. 19 and 20 illustrate variant embodiments of security articles according to the invention, and FIG. 21 illustrates another variant embodiment of security articles according to the invention.

Represented in FIG. 1 is a security element 1 produced in accordance with the invention, which comprises a non-opaque, for example perfectly transparent, substrate 2 having a first face 2*a* carrying a plurality of interleaved coded images $I_1, I_2, \ldots, I_n$, the constituent elements 3 of these images taking for example the form of continuous or discontinuous lines, usually discontinuous. The set of coded images $I_1, \ldots, I_n$ forms a combined image I, as may be seen in FIG. 3.

The second face 2*b* of the substrate 2, opposite from the first face, carries an exposure screen 4 (also called a decomposition filter) comprising opacifying strips 5 (or lines).

The exposure screen 4 is composed of a periodic pattern, in this instance the opacifying strip 5, of constant period p, as may be seen in FIG. 2. The periodicity is observed parallel to the direction of the relative displacement X between the optical system and the observer making it possible to observe the various coded images.

The simplest embodiment of the exposure screen 4 is a succession of opacifying strips 5 of constant width at regular intervals, as illustrated in FIG. 2. The period p corresponds to the sum of the width of an opacifying strip 5 and of a transparent interval between two consecutive opacifying strips 5. In the example illustrated, each of the opacifying strips 5 is oriented perpendicularly to the relative displacement axis X.

The exposure screen 4 can comprise patterns other than strips of constant width with rectilinear and parallel edges, such as notches or waves, such as illustrated respectively in FIGS. 6A and 6B.

The security element 1 further comprises a background 30 such that the combined image I is situated between the background 30 and the substrate 2.

The background 30 may be produced such as described previously. In particular, the background 30 may be printed or metallized. The background 30 may be fixed to the combined image I for example by gluing.

The background 30 can comprise fluorescent and/or phosphorescent particles, and observation can be done under predefined lighting, for example UV and/or IR.

The combined image (I), the background (30) and the exposure screen (4) may or may not be of different colors. The combined image (I) and the exposure screen (4) may have the same color and the background (30) be of another color, especially darker.

The presence of the background 30 may make it possible to improve the observation of the coded images from the side of the face 2*b* of the substrate 2, especially through the appearance of a contrast effect due for example to the differences of colors between the exposure screen 4, the combined image I and the background 30.

If N is the total number of coded images, a possible relation between the period p of the exposure screen, the width w of the transparent zone between two opacifying strips 5 of the screen 4 and the number N is:

N=(p/w).

The transparent intervals 8 of the exposure screen 4 may make it possible, if so desired, to expose a single image at a time. A coded image then corresponds to the parts of the combined image that are present in the transparent intervals of the screen for a given angle of observation. Each coded image may be visible by shifting the observation by the width of a transparent interval 8.

All the constituent elements of one and the same coded image are disposed, in the example described, with the same period p as opacifying strips of the exposure screen 4, along the axis X.

Illustrated in FIG. 3 is an exemplary formation of a combined image I by adding together a plurality of coded images, for example four coded images $I_1$ to $I_4$.

Illustrated in FIG. 4 is the production of a coded image $I_i$ on the basis of an original image J from which the image of the exposure screen 4 is subtracted.

Represented in FIG. 5 is the aspect of the various images $I_1$ to $L_4$, when the angle of observation α represented in FIG. 1, in relation to the optical system, changes. The animation corresponding to the coded images may be exposed in reflection, exposure screen side or combined image side, for example as a function of the opacity of the background 30.

Moreover, although a single exposure screen serves for the creation of the combined image, several different exposure screens may be used to expose the coded images.

For example, all the exposure screens preserving the same period and the same pattern as the initial screen, in the direction perpendicular to the translation, but with a different width of transparent interval, may be used, as illustrated in FIGS. 6C to 6E. This may make it possible to view several coded images at the same time, and this may afford clarity to the animation, to the detriment of the definition.

Exposure screens having a period that is a multiple of the period p of the initial screen also work, this being equivalent to artificially increasing the number N of coded images to the detriment of the definition of the images, as illustrated in FIGS. 6F to 6G.

Of course, diverse actions on the period p and on the width of the transparent interval 8 may be carried out simultaneously, as illustrated in FIG. 6H.

To be able to view all the coded images up to an angle of inclination of about 45°, the period p is preferably less than or equal to approximately the thickness e of the substrate, as represented in FIG. 1.

A security thread generally exhibits a maximum thickness of 50 μm, thereby corresponding to a screen of period less than or equal to 50 μm.

In the case where four interleaved images are envisaged, the lines 3 making up the interleaved images will in general exhibit a width of less than or equal to 12.5 μm. The system making it possible to form the combined image then having a minimum resolution of $2.54\ 10^{-2}/12.5\ 10^{-6}$, that is to say of 2032 dots per inch (dpi).

The screen can then take the form of a succession of lines of width 3×12.5=37.5 μm separated by a distance of 12.5 μm.

For example, if a substrate with a thickness e of about 100 μm is used, the period p of the screen is less than 100 μm and the constituent elements in the form of lines 3 making up the coded images are less than 33 μm, in the case of three images per animation.

A width of 12.5 μm corresponds to about 2000 dpi, thereby representing a limit for conventional printers which generally have a maximum definition of 600 dpi, or indeed 1200 dpi, thereby constituting a security factor, especially anti-copying or anti-photocopying security.

It may thus be advantageous to have a substrate whose thickness e is less than or equal to 30 μm, better 25 μm, for example lying between 20 and 30 μm, or indeed 20 and 25 μm, bounds included or excluded.

A sufficiently fine exposure screen makes it possible to afford anti-photocopying security and the existence of several coded images having details to be viewed according to different directions of observation also creates a protection against the use of scanners.

Moreover, the human eye not perceiving details of less than approximately 200 μm, a sufficiently fine exposure screen appears of homogeneous aspect, for example gray when using black opacifying strips. Despite the fineness of the exposure screen, the animation may be preserved, comprising coded images of scale greater than a millimeter, which contrast with the homogeneous aspect of the screen.

As explained hereinabove, it might be thought that the resolution values mentioned previously are too big to allow the observation of an optical effect, this impression being corroborated by the fact that the eye cannot distinguish the lines of the screen and sees the latter as a homogeneous flat expanse.

It may be considered that the resolving power of the human eye is a minute of arc, corresponding for a distance of observation of 30 cm, acceptable in the case of a security document, to a value of $2\times\tan(1/120)\times30\ 10^{-2}=87\ 10^{-6}$ m i.e. 87 μm.

Despite the fineness of the screen and of the combined image, the interleaved images may be successively visible upon a change of the angle of observation.

Resolutions of more than 2000 dpi, or indeed 3000 dpi, may enable the device to be made even more secure.

Hence, whatever the color or colors used for the exposure screen and/or the combined image, the printing definition may be accurate enough for the mixture of the colors to appear as homogeneous.

By way of example, an exemplary security document 10 comprising a plurality of security elements 1 according to the invention has been illustrated in FIGS. 14A and 14B, greatly magnified.

FIG. 14A represents the observation of the security document 10 after photocopying, and FIG. 14B represents the observation of the document 10 before photocopying. As may be noted, the invention provides high anti-photocopying security. Furthermore, the exposure screen may be fine enough to afford a homogeneous coloration effect during observation, in contradistinction to what is observed in FIG. 14B which is greatly magnified.

As the optical system can operate in transmitted or reflected light, it may be used for windows or threads introduced as windows, for example in a banknote.

It is not necessary to tag the exposure screen with respect to the combined image in the direction of the relative displacement X. But as a function of the pattern of the screen, tagging may be necessary in the direction perpendicular to this displacement. For example, for a linear exposure screen such as illustrated in FIG. 2, no tagging is necessary; on the other hand, for a wavy screen, a more or less precise tagging, as a function of the amplitude and of the frequency of the waves, may turn out to be desirable.

The invention thus offers a possibility of providing security that can be tailored as a function of the protection required and of the difficulty of implementation.

In a variant implementation of the invention, illustrated in FIG. 7, the verso face 2*a* of the substrate 2 is reflecting or semi-reflecting and the recto face 2*b* comprises the combined image I. The reflecting face may be produced by metallization. The reflecting face may for example define a text.

It is possible to view the coded images $I_1, \ldots, \ldots I_N$ by reflection on the reflecting face 2*a*. This variant has the particular feature of allowing production of the coded images with half as big a definition, but requires tagging between the coded images and the exposure screen, since the exposure screen externally overlaps the lines of the combined image. Each opacifying strip 5 can overlap the constituent elements 3 of several coded images.

The exposure screen 4 may advantageously comprise one or more fluorescent and/or phosphorescent particles allowing the appearance of contrast effects under predefined lighting, for example UV or IR.

The combined image I and/or the exposure screen 4 may be formed by printing, demetallization, laser marking, lithography or any other technique making it possible to fix or reveal an image.

To improve security, it is possible to use liquid-crystal inks, for example to print the combined image I. In order to be exposed, the animation may then require in addition to the decomposition screen, the use of a polarizer filter, which may be present on the document or the substrate, or not.

For the security elements formed of a thread introduced as window(s) into a security document, the combined image I may be obtained by micro-photolithography of the thread and the exposure screen 4 may be produced by virtue of a UV offset printing performed subsequently, when printing the document.

The exposure screen 4 may be associated, if appropriate, with a printing design of the document.

The pattern of the exposure screen 4 may be printed otherwise than overlaid with the combined image I, on the document, to the same scale or to a different scale.

The printing of the exposure screen 4 can run beyond the security element 1 and extend over the security document 10, as illustrated in FIG. 11.

It is possible to use several colors, for example a first color for the exposure screen 4 and one or more other colors for the combined image I, for example as many different colors as there are coded images.

It is further possible to overlay two colors on the exposure screen 4 and the combined image I, as illustrated in FIG. 8, thereby making it possible to have the animation of one color in the case of observation of the optical system from the screen side and of another color in the case of observation of the optical system from the combined image side.

This double coloration may be produced by demetallization or photolithography, for example.

In FIG. 10, the exposure screen 4 comprises overlaid opacifying strips 5*a* and 5*b* respectively of a first color $C_1$ and of a second color $C_2$, the opacifying strips 5*a* of color $C_1$ being exterior. The elements 3 of the combined image I are printed respectively with the two colors $C_1$ and $C_2$ overlaid, the elements of color $C_2$ being exterior. Thus, the order of overlaying of the colors may be the same on each side of the substrate 2.

A possibility for varying the direction of observation of the optical system may be to deform the substrate, for example around a folding axis, as illustrated in FIG. 9.

Several optical systems, having for example the form of small squares or rectangles with sides of a few millimeters, may be present on one and the same security thread 20, as illustrated in FIGS. 10 and 12.

Rotating one optical system 1 out of two by a quarter turn may make it possible to obtain a thread producing animations on the basis of relative displacements of the thread in the two principal axes $Y_1$ and $Y_2$ with respect to the observer.

When the security element is an integrated thread built in as window(s), as illustrated in FIGS. 13A and 13B, the document 10 can comprise at least two windows 31 and 32 making it possible to observe respectively each of the faces of the thread, in reflection.

The coded images are observable through the exposure screen 4 from the side of the window 31 and with the exposure screen as background, from the side of the window 32.

The substrate of the document, especially at the level of the windows 31 and 32, may also be at least partially transparent so as to allow the observation of the coded images from both sides of the security document.

The security element in the form of a security thread may further be incorporated into a security document 10 which exhibits an alternation of windows 31 and 32 recto side and verso side, as illustrated in FIG. 13C. It is thus possible to observe the coded images at one and the same time from the recto side and from the verso side of the security document 10 at the level of the windows 31 and 32.

Variants of observation of security elements 1 according to the invention have been illustrated in FIGS. 15 and 16.

The security element 1 can comprise a background 30 such that the security screen 4 is between the face 2*b* of the substrate 2 and the background 30, as illustrated in FIG. 15. As a variant, the combined image I may be between the background 30 and the face 2*a* of the substrate 2, as illustrated in FIG. 16.

In these exemplary embodiments, the exposure screen 4 is black in color, the combined image I is red in color and the background 30 is green in color, being fluorescent especially. In this way, the observation, especially under UV lighting, of the security element 1 engenders a significant contrast effect resulting especially from the choice of the colors of the exposure screen, the combined image and the background.

In the example of FIG. 15, the user can thus observe a black colored exposure screen 4 and a red colored spiral in contrast with the black color of the exposure screen and the green color of the background 30.

In the example of FIG. 16, the user can thus observe an exposure screen appearing as a mixture of red and black, the red color of the coded images possibly being formed by pixels, and a red colored spiral in contrast with the green color of the background and the mixture of the black and red colors of the exposure screen.

Represented in FIG. 17 is another exemplary security article 10 according to the invention comprising a security element such as described previously devoid of background 30.

In this example, the substrate 15 of the security article is overlaid on the combined image I of the security element 1 and advantageously plays the role of the background 30 described previously.

In particular, the substrate 15 can comprise at the level of its part 16 overlaid on the combined image I fluorescent pigments making it possible to observe particular effects between the coded images and the part 16 of the substrate 15 under UV and/or IR lighting. Of course, other variant embodiments are possible. The substrate 15 could be formed differently on the basis of elements described above for the background.

Represented in FIG. 18 is a variant embodiment of an exposure screen 4 and of a combined image I that can be used in a security element 1 according to the invention.

In particular, this exemplary embodiment illustrates the possibility of producing an exposure screen 4 and a combined image I in such a way that the coded images may be observable in the two principal directions of inclination of the security element 1, especially in the direction of the width and of the length.

The exposure screen 4 can thus result from the combining of two screens 4*a* and 4*b* exhibiting strips extending along perpendicular axes, as may be seen in FIG. 18. In the same manner, the combined image I can result from the combining of combined images Ia and Ib which correspond respectively to the combined images associated with the screens 4*a* and 4*b*.

The animation effect obtained can thus be observable in at least two directions of inclination of the security element 1.

Represented in FIG. 19 is an exemplary security article 10 comprising a perforation 40 in which two sub-elements, especially in the form of foils or patches, 41 and 42 are placed at least partially so as to form a security element 1 according to the invention.

The sub-element 41 comprises for example an exposure screen 4 and the sub-element 42 comprises for example the corresponding combined image I. The background 30 may for example be present on the surface of the sub-element 41.

In the variant illustrated in FIG. 20, the security article 10 comprises a combined image I produced in the form of prints on the surface of the security article 10. Moreover, a sub-element, especially in the form of a foil or patch, 43 is placed on the prints constituting the combined image I, the sub-element 43 comprising the corresponding exposure screen 4, not represented. The background consists for example of the substrate 44 of the security article 10 but it could be otherwise and the security element 1 could comprise its own background.

In the examples of FIGS. 19 and 20, the exposure screens 4 and/or the combined images I could be produced differently, being for example incorporated or situated above or below the sub-elements 41, 42 and 43.

In the example of FIG. 21, the security element 1 differs from that of FIG. 1 in that it comprises two non-opaque substrate layers 2, for example perfectly transparent, and two combined images I and I'. Here the two substrate layers have the same thickness, for example 25 μm.

The first combined image I is disposed between a substrate layer 2 and the background 30 and represents for example a pattern such as a cloud.

The second combined image I' is disposed between the two substrate layers 2 and represents in the example considered a pattern such as a horse.

The period p of the exposure screen is in the example considered equal to the thickness of a substrate layer, that is to say to 25 μm.

The interleaved images L and forming respectively the first and the second combined image are in the example of FIG. 21 disposed in the same manner in such a way that upon a change of angle of observation from the face 2*a* of the security element, the pattern represented by the second combined image I' will move twice as slowly as the pattern represented by the first combined image I given that half as many interleaved images $I'_i$ as interleaved images $I_i$ will have been viewed by the eye. This example makes it possible to highlight the possibility with the invention of obtaining a motion effect between the patterns represented on the interleaved images. Such an effect, which may furthermore be termed a "depth effect", is for example similar to that afforded by the "differential scrolling" of the first video games.

The example of FIG. 21 may be obtained by assembling, especially by gluing, the various substrate layers 2. According to another method, the example of FIG. 21 is obtained on the basis of a laser-markable monolayer substrate in which at least the combined image I is formed in the substrate by exposure to laser radiation. The combined image I', the exposure screen and/or the background are especially printed or marked by laser irradiation.

The use of the laser makes it possible to mark said laser-markable substrate at the desired depth, and also to mark said substrate at least two different depths (thicknesses), for example to form in a monolayer substrate at least two of the elements out of the exposure screen and the combined images.

The invention is not limited to the examples illustrated. The security element may furthermore be produced with other securities of first, second or third level, for example.

The expression "comprising a" should be understood as being synonymous with "comprising at least one".

The invention claimed is:

1. A security element, comprising:

an optical system, comprising:

a transparent or translucent substrate;

on the side of a first face of the substrate a combined image comprising a plurality of interleaved coded images; and an exposure screen overlaid on the combined image configured to enable observation of the coded images upon a change of the direction of observation of the security element in relation to the optical system, the exposure screen being:

situated on the side of a second face of the substrate, opposite from the first face, the optical system then comprising a background disposed in such a way that the exposure screen is between the background and the substrate or that the combined image is between the background and the substrate, the exposure screen, the combined image and the background having different colors.

2. A security element, comprising:

an optical system, comprising:

a transparent or translucent substrate;

on the side of a first face of the substrate a combined image (I) comprising a plurality of interleaved coded images; and an exposure screen overlaid on the combined image configured to enable observation of the coded images upon a change of the direction of observation of the security element in relation to the optical system, the exposure screen being:

situated on the side of a second face of the substrate, opposite from the first face, the optical system then comprising a background disposed in such a way that the exposure screen is between the background and the substrate or that the combined image is between the background and the substrate, the exposure screen and the combined image having the same color and the background having a different color.

3. The security element as claimed in claim 1 wherein the background is printed.

4. The security element as claimed in claim 1, wherein the background further comprises luminescent dyes and/or pigments and/or interferential pigments and/or liquid-crystal pigments and/or photochromic or thermochromic pigments, in printed form or incorporated into the background.

5. The security element as claimed in claim 1, wherein the background further comprises a luminescent agent.

6. The security element as claimed in claim 1, wherein the background further comprises a metal layer.

7. The security element as claimed in claim 6, wherein the metal is chosen from among silver, aluminum, nickel, cobalt, tin, gold, copper, and from among the alloys of metals.

8. The security element as claimed in claim 1, wherein the background is totally overlaid on the exposure screen or on the combined image.

9. The security element as claimed in claim 1, wherein the background is opaque.

10. The security element as claimed in claim 1, wherein the background is non-opaque.

11. The security element as claimed in claim 1, wherein the background is physically continuous.

12. The security element as claimed in claim 1, the exposure screen and/or the combined image being of homogeneous aspect to the naked eye.

13. The security element as claimed in claim 1, the exposure screen and/or the combined image having a resolution greater than or equal to 800 dpi.

14. The security element as claimed in claim 1, the substrate having a thickness ranging from 10 μm to 1 mm.

15. The security element as claimed in claim 1, a number of coded images ranging from 2 to 15.

16. The security element as claimed in claim 1, a distance between two consecutive elements of one and the same coded image ranging from 10 μm to 1 mm.

17. The security element as claimed in claim 1, the exposure screen and/or the combined image being devoid of a metal layer.

18. The security element as claimed in claim 1, wherein the security element comprises a security thread, film or patch.

19. The security element as claimed in claim 1, the combined image, and/or the exposure screen being produced with different colors.

20. The security element as claimed in claim 1, comprising two exposure screens respectively associated with two combined images, an orientation of the strips of one of the exposure screens being different from that of the other exposure screen.

21. A security article, incorporating a security element as defined in claim 1.

22. The security article as claimed in claim 21, the recto and verso faces of the security element being observable.

23. A security article, comprising a security element comprising an optical system, comprising:

a transparent or translucent substrate;

on the side of a first face of the substrate a combined image comprising a plurality of interleaved coded images; and an exposure screen situated on the side of a second face of the substrate, opposite from the first face, overlaid on the combined image, the exposure screen configured to enable observation of the coded images upon a change of the direction of observation of the security element in relation to the optical system, the substrate of the security article overlapping at least partially the combined image and/or the exposure screen of the security element.

24. The security article as claimed in claim 21, comprising a perforation in which is at least partially placed the security element corresponding to the juxtaposition of two sub-elements comprising respectively the exposure screen and the corresponding combined image.

25. The security article as claimed in claim 21, the exposure screen or the combined image being produced in the form of prints on the surface of the article, a sub-element overlapping at least partially the prints formed, the sub-element comprising the combined image or the corresponding exposure screen.

26. A method for manufacturing a security article as claimed in claim 21, the exposure screen being formed by printing of the article and the substrate of the security element being fixed to the article.

27. A method for authenticating the security element as defined in claim 1, comprising observing the security element while varying the direction of observation and in concluding as to the authenticity of an article or object associated with the security element at least as a function of the coded images observed.

28. A security element, comprising:

an optical system, comprising:

a transparent or translucent substrate;

on the side of a first face of the substrate a combined image comprising a plurality of interleaved coded images; and an exposure screen overlaid on the combined image, configured to enable observation of the coded images upon a change of the direction of observation of the security element in relation to the optical system, the exposure screen being situated on the side of the first face, the combined image then being situated between the exposure screen and the substrate, in which case the security element comprises on the side of the second face a reflecting surface making it possible to observe the coded images through the exposure screen.

29. The security element as claimed in claim 28, the exposure screen and/or the combined image being of homogeneous aspect to the naked eye.

30. The security element as claimed in claim 28, the exposure screen and/or the combined image having a resolution greater than or equal to 800 dpi.

31. The security element as claimed in claim 28, the substrate having a thickness ranging from 10 μm to 1 mm.

32. The security element as claimed in claim 28, a number of coded images ranging from 2 to 15.

33. The security element as claimed in claim 28, a distance between two consecutive elements of one and the same coded image ranging from 10 μm to 1 mm.

34. The security element as claimed in claim 28, the exposure screen and/or the coded image being devoid of metal layer.

35. The security element as claimed in claim 28, wherein the security element comprise a security thread, film or patch.

36. The security element as claimed in claim 28, the combined image and/or the exposure screen being produced with different colors.

37. The security element as claimed in claim 28, comprising two exposure screens respectively associated with two combined images, an orientation of the strips of one of the exposure screens being different from that of the other exposure screen.

38. A security article incorporating a security element as defined in claim 28.

39. The security article as claimed in claim 38, the recto and verso faces of the security element being observable.

40. The security article as claimed in claim 38, comprising a perforation in which is at least partially placed the security element corresponding to the juxtaposition of two sub-elements comprising respectively the exposure screen and the corresponding combined image.

41. The security article as claimed in claim 38, the exposure screen or the combined image being produced in the form of prints on the surface of the article, a sub-element overlapping at least partially the prints formed, the sub-element comprising the combined image or the corresponding exposure screen.

42. A method for manufacturing the security article as claimed in claim 38, comprising forming the exposure screen by printing of the article and fixing the substrate of the security element to the article.

43. A method for authenticating the security element as defined in claim 28, comprising observing the security element while varying the direction of observation and in concluding as to the authenticity of an article or object associated with the security element at least as a function of the coded images observed.

* * * * *